(12) United States Patent
Lin et al.

(10) Patent No.: US 12,317,314 B2
(45) Date of Patent: May 27, 2025

(54) METHOD AND APPARATUS FOR DOWNLINK CONTROL INFORMATION

(71) Applicant: Telefonaktiebolaget LM Ericsson (publ), Stockholm (SE)

(72) Inventors: Zhipeng Lin, Nanjing (CN); Robert Mark Harrison, Grapevine, TX (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 17/754,895

(22) PCT Filed: Oct. 14, 2020

(86) PCT No.: PCT/CN2020/120900
§ 371 (c)(1),
(2) Date: Apr. 14, 2022

(87) PCT Pub. No.: WO2021/073534
PCT Pub. Date: Apr. 22, 2021

(65) Prior Publication Data
US 2024/0306187 A1    Sep. 12, 2024

(51) Int. Cl.
H04W 74/00       (2009.01)
H04W 74/0836   (2024.01)

(52) U.S. Cl.
CPC ..... *H04W 74/006* (2013.01); *H04W 74/0836* (2024.01)

(58) Field of Classification Search
CPC .......... H04W 74/006; H04W 74/0836
USPC ....................................................... 370/329
See application file for complete search history.

(56) References Cited

U.S. PATENT DOCUMENTS

| | | | |
|---|---|---|---|
| 11,617,195 B2* | 3/2023 | Huang | H04L 5/0048 |
| | | | 370/329 |
| 2012/0327891 A1 | 12/2012 | Nam et al. | |
| 2019/0306841 A1 | 10/2019 | Huang et al. | |
| 2020/0305168 A1* | 9/2020 | Liou | H04L 5/0098 |

(Continued)

FOREIGN PATENT DOCUMENTS

| | | |
|---|---|---|
| CN | 101651995 A | 2/2010 |
| WO | 2017160052 A2 | 9/2017 |

OTHER PUBLICATIONS

Examination Report, IN App. No. 202247026931, Sep. 2, 2022, 6 pages.

(Continued)

*Primary Examiner* — Faisal Choudhury
(74) *Attorney, Agent, or Firm* — Nicholson De Vos Webster & Elliott LLP

(57) ABSTRACT

Methods and apparatuses for downlink control information. A method at a network device comprises determining a format of downlink control information (DCI) used for scheduling of downlink shared channel in a 2-step random access procedure. The method further comprises determining an identifier used for scrambling cyclic redundancy check (CRC) of the format of DCI. The identifier comprises at least one of a common identifier or a specific identifier. The method further comprises transmitting information regarding a scheduled downlink shared channel with the format of DCI with the CRC scrambled by the identifier on a downlink control channel to at least one terminal device.

11 Claims, 14 Drawing Sheets

(56) References Cited

U.S. PATENT DOCUMENTS

2020/0314917 A1* 10/2020 Jeon ..................... H04W 74/08
2022/0232638 A1* 7/2022 Zhang ............... H04W 74/0833

OTHER PUBLICATIONS

International Preliminary Report on Patentability, PCT App. No. PCT/CN2020/120900, Apr. 28, 2022, 5 pages.
International Search Report and Written Opinion for Application No. PCT/CN2020/120900, dated Jan. 12, 2021, 10 pages.
ZTE Corporation et al., "New work item: 2-step RACH for NR," Dec. 10-13, 2018, 5 pages, 3GPP TSG RAN Meeting #82, RP-182894, Sorrento, Italy.
ZTE Corporation, "Revised work item proposal: 2-step RACH for NR," Sep. 16-20, 2019, 4 pages, 3GPP TSG RAN Meeting #85, RP-192330, Newport Beach, USA.
Ericsson, "Procedure for Two-step RACH," Oct. 14-18, 2019, 20 pages, 3GPP TSG-RAN WG1 Meeting #98, R1-1910907, Chongqing, China.
Motorola Mobility et al., "2-step RACH procedure," Oct. 14-20, 2019, 6 pages, 3GPP TSG RAN WG1 #98bis, R1-1911035, Chongqing, China.
3GPP TS 38.212 V15.7.0, "3rd Generation Partnership Project; Technical Specification Group Radio Access Network; NR; Multiplexing and channel coding (Release 15)," Sep. 2019, 101 pages, 3GPP Organizational Partners.
3GPP TS 38.213 V15.6.0, "3rd Generation Partnership Project; Technical Specification Group Radio Access Network; NR; Physical layer procedures for control (Release 15)," Jun. 2019, 107 pages, 3GPP Organizational Partners.
3GPP TS 38.213 V15.7.0, "3rd Generation Partnership Project; Technical Specification Group Radio Access Network; NR; Physical layer procedures for control (Release 15)," Sep. 2019, 108 pages, 3GPP Organizational Partners.
3GPP TS 38.214 V15.7.0, "3rd Generation Partnership Project; Technical Specification Group Radio Access Network; NR; Physical layer procedures for data (Release 15)," Sep. 2019, 106 pages, 3GPP Organizational Partners.
3GPP TS 38.321 V15.7.0, "3rd Generation Partnership Project; Technical Specification Group Radio Access Network; NR; Medium Access Control (MAC) protocol specification (Release 15)," Sep. 2019, 78 pages, 3GPP Organizational Partners.
European Search Report and Search Opinion, EP App. No. 20877814.2, Sep. 25, 2023, 8 pages.
Nokia, "Remaining details of 2-step RACH Procedure," Oct. 14-18, 2019, 31 pages, 3GPP TSG RAN WG1 #98bis, R1-1910689, Chongqing, China.

* cited by examiner

300

302

Determining a format of downlink control information, DCI, used for scheduling of downlink shared channel in a 2-step random access procedure

304

Determining an identifier used for scrambling cyclic redundancy check, CRC, of the format of DCI, wherein the identifier comprises at least one of a common identifier or a specific identifier

306

Transmitting information regarding a scheduled downlink shared channel with the format of DCI with the CRC scrambled by the identifier on a downlink control channel to at least one terminal device

Receiving a first message including a random access preamble and payload from a terminal device

404

Determining a format of downlink control information, DCI, used for scheduling of downlink shared channel in a 2-step random access procedure

406

Determining an identifier used for scrambling cyclic redundancy check, CRC, of the format of DCI, wherein the identifier comprises at least one of a common identifier or a specific identifier

408

Transmitting information regarding a scheduled downlink shared channel with the format of DCI with the CRC scrambled by the identifier on a downlink control channel to at least one terminal device

410

Transmitting a second message as a response to the first message on the scheduled downlink shared channel to the terminal device

Transmitting a first message including a random access preamble and payload to the network device

604

Receiving a downlink control channel with a format of downlink control information, DCI, with cyclic redundancy check, CRC, scrambled by an identifier

606

Obtaining information regarding a scheduled downlink shared channel in a 2-step random access procedure with the format of DCI with the CRC scrambled by the identifier on the downlink control channel, wherein the scheduled downlink shared channel is transmitted by the network device and the identifier comprises at least one of a common identifier or a specific identifier

608

Receiving a second message as a response to the first message on the scheduled downlink shared channel from the network device

FIG. 6

METHOD AND APPARATUS FOR DOWNLINK CONTROL INFORMATION

CROSS-REFERENCE TO RELATED APPLICATIONS

This application is a National stage of International Application No. PCT/CN2020/120900, filed Oct. 14, 2020, which claims priority to International Application No. PCT/CN2019/111079, filed Oct. 14, 2019, which are hereby incorporated by reference.

TECHNICAL FIELD

The non-limiting and exemplary embodiments of the present disclosure generally relate to the technical field of communications, and specifically to methods and apparatuses for downlink control information.

BACKGROUND

This section introduces aspects that may facilitate a better understanding of the disclosure. Accordingly, the statements of this section are to be read in this light and are not to be understood as admissions about what is in the prior art or what is not in the prior art.

In a wireless communication system such as NR (new radio), downlink control information (DCI) may be transmitted from a network node such as a base station to a terminal device such as user equipment (UE) to schedule and/or convey some information regarding such as downlink or uplink data transmission, configuration, etc. For example, 3rd Generation Partnership Project (3GPP) TS 38.212 V15.7.0, the disclosure of which is incorporated by reference herein in its entirety, has defined some DCI formats such as DCI format1_0, DCI format 1_1, etc. The DCI may be used in various communication procedures such as random access procedure.

The random access procedure may be needed for a UE to get access to the wireless communication system. Before initiating the random access procedure, the UE may need to go through an initial synchronization process. For example, the UE may need to detect a synchronization signal (SS) such as Primary Synchronization Signals (PSSs) and Secondary Synchronization Signals (SSSs), etc. Then the UE may decode broadcasted system information. The next step is known as the random access procedure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a solution for downlink control information.

In a first aspect of the disclosure, there is provided a method performed by a network device. The method comprises determining a format of downlink control information, DCI, used for scheduling of downlink shared channel in a 2-step random access procedure. The method further comprises determining an identifier used for scrambling cyclic redundancy check, CRC, of the format of DCI. The identifier comprises at least one of a common identifier or a specific identifier. The method further comprises transmitting information regarding a scheduled downlink shared channel with the format of DCI with the CRC scrambled by the identifier on a downlink control channel to at least one terminal device.

In an embodiment, the method may further comprise receiving a first message including a random access preamble and payload from a terminal device. The method may further comprise transmitting a second message as a response to the first message on the scheduled downlink shared channel to the terminal device. In an embodiment, multiple messages for multiple terminal devices can be multiplexed in the second message.

In an embodiment, the first message may be message A, msgA, and the second message may be message B, msgB, in a 2-step random access procedure.

In an embodiment, the format of DCI may include at least one of DCI format 1_0, DCI format 1_1 or a new DCI format.

In an embodiment, determining the format of DCI used for scheduling of downlink shared channel may comprise determining only DCI format 1_0 used for scheduling of downlink shared channel; or determining DCI format 1_1 or new DCI format used for scheduling of downlink shared channel; or determining the format of DCI used for scheduling of downlink shared channel based on at least one of a quantity of messages multiplexed in a message transmitted in the scheduled downlink shared channel or a type of message transmitted in the scheduled downlink shared channel.

In an embodiment, the information regarding the scheduled downlink shared channel may include a combination of information that can be transmitted from the network device to the terminal device by means of the format of DCI with the CRC scrambled by different identifiers.

In an embodiment, the information regarding the scheduled downlink shared channel includes fields that can be transmitted from the network device to the terminal device by means of a format of DCI with a CRC scrambled by a temporary cell radio network temporary identifier, TC-RNTI.

In an embodiment, the information regarding the scheduled downlink shared channel includes a combination of fields that can be transmitted from the network device to the terminal device by means of a format of DCI with a CRC scrambled by temporary cell radio network temporary identifier, TC-RNTI and a format of DCI with a CRC scrambled by random access radio network temporary identifier, RA-RNTI.

In an embodiment, the information regarding the scheduled downlink shared channel includes fields that are transmitted from the network device to the terminal device by means of DCI format 1_0 with the CRC scrambled by the TC-RNTI, and the downlink assignment index in DCI format 1_0 with CRC scrambled by TC-RNTI is replaced by transport block, TB, scaling.

In an embodiment, at least one fields in the DCI format 1_0 with the CRC scrambled by the TC-RNTI is reserved.

In an embodiment, the reserved at least one field in the DCI format 1_0 with the CRC scrambled by the TC-RNTI comprises: Identifier for DCI formats, New data indicator, Redundancy version, HARQ process number, TPC command for scheduled PUCCH, PUCCH resource indicator, and PDSCH-to-HARQ_feedback timing indicator.

In an embodiment, the information regarding the scheduled downlink shared channel may include information that can be transmitted from the network device to the terminal device by means of DCI format 1_0 with the CRC scrambled by temporary cell radio network temporary identifier, TC-RNTI, and the downlink assignment index in DCI format 1_0 with CRC scrambled by TC-RNTI is replaced by transport block, TB, scaling.

In an embodiment, the format of DCI is DCI format 1_0 with CRC scrambled by temporary cell-radio network temporary identifier, TC-RNTI, or random access-radio network temporary identifier, RA-RNTI, and at least one information in DCI format 1_0 with CRC scrambled by TC-RNTI or RA-RNTI may be reserved.

In an embodiment, the reserved at least one information may be depending on at least one of a quantity of messages multiplexed in a message transmitted in the scheduled downlink shared channel; a type of message transmitted in the scheduled downlink shared channel; whether a retransmission is supported for a message transmitted on the scheduled downlink shared channel; whether a dynamic power control is supported for physical uplink control channel, PUCCH, for hybrid automatic repeat request, HARQ, feedback of a message transmitted on the scheduled downlink shared channel; or whether a message transmitted on the scheduled downlink shared channel is a message during a Physical Downlink Control Channel, PDCCH, ordered 2-step random access.

In an embodiment, when no dynamic power control of PUCCH is supported, transmit power control, TPC, command for scheduled PUCCH may be reserved; and/or when the message transmitted on the scheduled downlink shared channel is a message during PDCCH ordered 2-step random access and the identifier is cell-radio network temporary identifier, C-RNTI, or configured scheduling-radio network temporary identifier, CS-RNTI, or MCS-C-RNTI, random access preamble index may be set with all zero values; and/or when the retransmission is not supported for the message transmitted on the scheduled downlink shared channel, new data indicator, redundancy version and HARQ process number may be reserved; and/or when the message transmitted on the scheduled downlink shared channel is not a message during PDCCH ordered 2-step random access and the identifier is cell-radio network temporary identifier, C-RNTI, or configured scheduling-radio network temporary identifier, CS-RNTI, or MCS-C-RNTI, HARQ process number may be reserved.

In an embodiment, the information regarding the scheduled downlink shared channel includes at least following fields: Frequency domain resource assignment, Time domain resource assignment, VRB-to-PRB mapping, Modulation and coding scheme, and TB scaling, Reserved bits.

In an embodiment, the downlink shared channel may be physical downlink shared channel, PDSCH, and the downlink control channel may be physical downlink control channel, PDCCH.

In an embodiment, when multiple messages for multiple terminal devices are multiplexed in a message transmitted in the scheduled downlink shared channel, DCI 1_0 format with CRC scrambled by random access-radio network temporary identifier, RA-RNTI, may be used; when single terminal device's message is carried in a message transmitted in the scheduled downlink shared channel, the DCI 1_0 format with CRC scrambled by TC-RNTI may be used.

In a second aspect of the disclosure, there is provided a method performed by a terminal device. The method comprises receiving a downlink control channel with a format of downlink control information, DCI, with cyclic redundancy check, CRC, scrambled by an identifier. The method further comprises obtaining information regarding a scheduled downlink shared channel in a 2-step random access procedure with the format of DCI with the CRC scrambled by the identifier on the downlink control channel. The scheduled downlink shared channel is transmitted by a network device and the identifier comprises at least one of a common identifier or a specific identifier.

In an embodiment, the method may further comprise transmitting a first message including a random access preamble and payload to the network device. The method may further comprise receiving a second message as a response to the first message on the scheduled downlink shared channel from the network device. In an embodiment, multiple messages for multiple terminal devices can be multiplexed in the second message.

In an embodiment, the format of DCI may be only DCI format 1_0.

In a third aspect of the disclosure, there is provided an apparatus at a network device. The apparatus comprises a processor; and a memory coupled to the processor, said memory containing instructions executable by said processor, whereby said apparatus is operative to determine a format of downlink control information, DCI, used for scheduling of downlink shared channel in a 2-step random access procedure. Said apparatus is further operative to determine an identifier used for scrambling cyclic redundancy check, CRC, of the format of DCI, wherein the identifier comprises at least one of a common identifier or a specific identifier. Said apparatus is further operative to transmit information regarding a scheduled downlink shared channel with the format of DCI with the CRC scrambled by the identifier on a downlink control channel to at least one terminal device.

In a fourth aspect of the disclosure, there is provided an apparatus at a terminal device. The apparatus comprises a processor; and a memory coupled to the processor, said memory containing instructions executable by said processor, whereby said apparatus is operative to detect a downlink control channel with a format of downlink control information, DCI, with cyclic redundancy check, CRC, scrambled by an identifier. Said apparatus is further operative to obtain information regarding a scheduled downlink shared channel in a 2-step random access procedure with the format of DCI with the CRC scrambled by the identifier on the downlink control channel. The scheduled downlink shared channel is transmitted by a network device and the identifier comprises at least one of a common identifier or a specific identifier.

In a fifth aspect of the disclosure, there is provided a network device. The network device comprises a first determining module, a second determining module and a transmitting module. The first determining module may be configured to determine a format of downlink control information, DCI, used for scheduling of downlink shared channel in a 2-step random access procedure. The second determining module may be configured to determining an identifier used for scrambling cyclic redundancy check, CRC, of the format of DCI, wherein the identifier comprises at least one of a common identifier or a specific identifier. The transmitting module may be configured to transmitting information regarding a scheduled downlink shared channel with the format of DCI with the CRC scrambled by the identifier on a downlink control channel to at least one terminal device.

In a sixth aspect of the disclosure, there is provided a terminal device. The terminal device comprises a receiving module and an obtaining module. The receiving module may be configured to detect a downlink control channel with a format of downlink control information, DCI, with cyclic redundancy check, CRC, scrambled by an identifier. The obtaining module may be configured to obtain information regarding a scheduled downlink shared channel in a 2-step random access procedure with the format of DCI with the CRC scrambled by the identifier on the downlink control channel. The scheduled downlink shared channel is transmitted by a network device and the identifier comprises at least one of a common identifier or a specific identifier.

In a seventh aspect of the disclosure, there is provided a computer program product, comprising instructions which, when executed on at least one processor, cause the at least one processor to carry out the method according to any of the above first to second aspects.

In an eighth aspect of the disclosure, there is provided a computer-readable storage medium storing instructions which when executed by at least one processor, cause the at least one processor to carry out the method according to any of the above first to second aspects.

According to another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station may be configured to carry out any step of the method according to the first aspect.

According to another aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry may be configured to carry out any step of the method according to the first aspect.

According to another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The terminal device may be configured to carry out any step of the method according to the second aspect.

According to another aspect of the disclosure, there is provided a communication system including a host computer comprising processing circuitry configured to provide user data and a communication interface configured to forward user data to a cellular network for transmission to a terminal device. The terminal device comprises a radio interface and processing circuitry. The processing circuitry of the terminal device may be configured to carry out any step of the method according to the second aspect.

According to another of the disclosure, there is provided a method implemented in a communication system including a host computer, a base station and a terminal device. The method comprises, at the host computer, receiving user data transmitted to the base station from the terminal device. The terminal device may be configured to carry out any step of the method according to the second aspect.

According to another aspect of the disclosure, there is provided a communication system including a host computer comprising a communication interface configured to receive user data originating from a transmission from a terminal device to a base station. The terminal device comprises a radio interface and processing circuitry. The processing circuitry of the terminal device may be configured to carry out any step of the method according to the second aspect.

According to another aspect of the disclosure, there is provided a method implemented in a communication system including a host computer, a base station and a terminal device. The method comprises, at the host computer, receiving, from the base station, user data originating from a transmission which the base station has received from the terminal device. The base station may be configured to carry out any step of the method according to the first aspect.

According to another aspect of the disclosure, there is provided a communication system including a host computer comprising a communication interface configured to receive user data originating from a transmission from a terminal device to a base station. The base station comprises a radio interface and processing circuitry. The base station's processing circuitry may be configured to carry out any step of the method according to the first aspect.

Embodiments herein afford many advantages, of which a non-exhaustive list of examples follows. Some embodiments herein may provide the DCI structure for the scheduling of the second message, i.e. msgB, in 2-step random access (RA) procedure in NR. Some embodiments herein may provide a forward compatible manner. Some embodiments herein may reduce the complexity of RA procedure protocol (such as 2-step RA procedure protocol). Some embodiments herein may minimize signaling overhead while providing the necessary flexibility for the scheduling of msgB PDSCH. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 shows a flowchart of a method according to an embodiment of the present disclosure;

FIG. 4 shows a flowchart of a method according to another embodiment of the present disclosure;

FIG. 6 shows a flowchart of a method according to another embodiment of the present disclosure;

DETAILED DESCRIPTION

Figure 1:
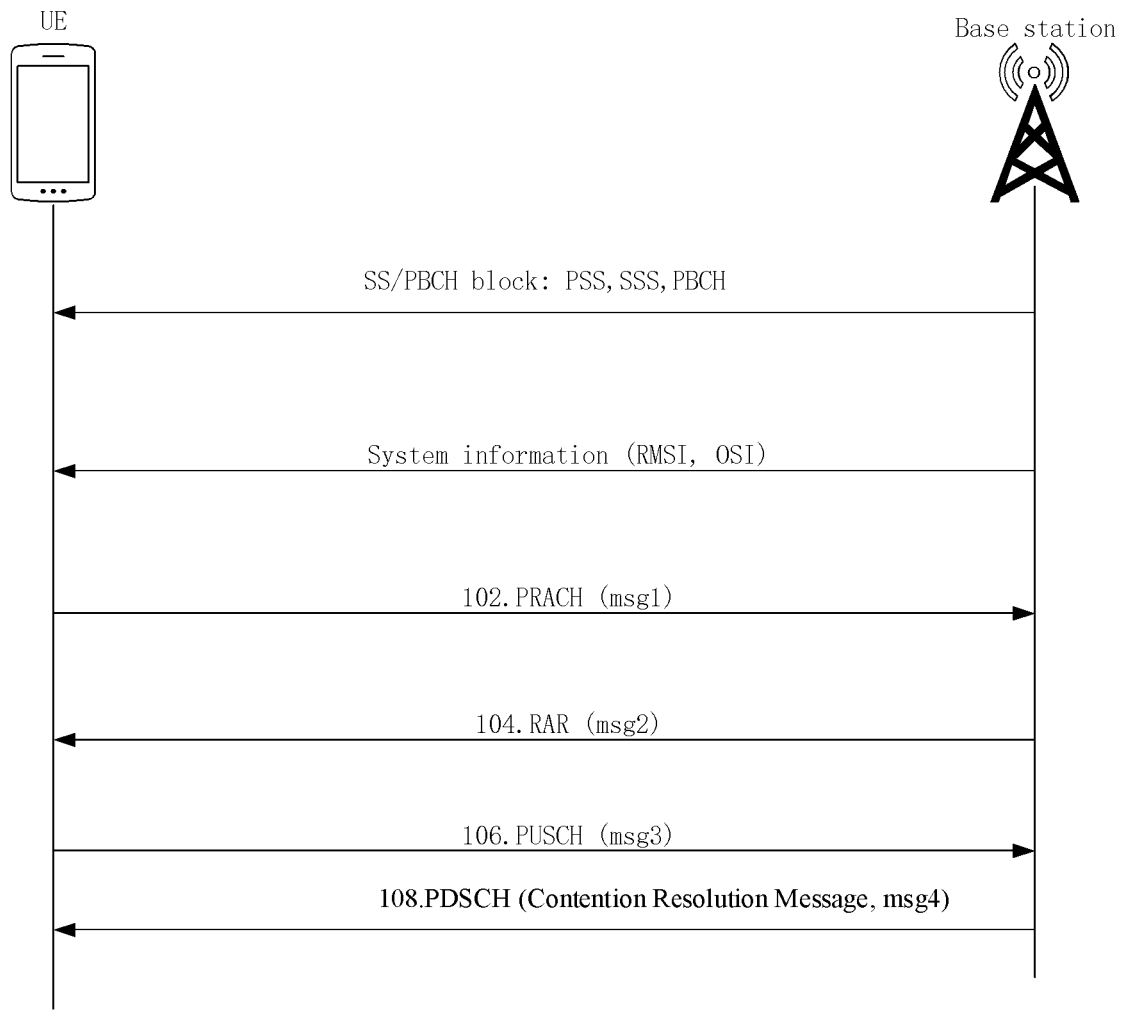
FIG. 1 shows a flowchart of a 4-step random access procedure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards such as new radio, long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as may comprise the first generation (1G), 2G, 3G, 4G, 4.5G, 5G communication protocols, and/or any other protocols either currently known or to be developed in the future.

The term "network entity" or "network node" as used herein refers to a network device (physical or virtual) in a communication network. For example, the network node may be an access network device in a communication network via which a terminal device accesses to the network and receives services therefrom. For example, the network node may comprise, but not limited to, an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device to a terminal device, and an uplink, UL, transmission refers to a transmission in an opposite direction.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that though the embodiments are mainly described in the context of random access procedure such as 2-step random access procedure, they are not limited to this but can be applied to any suitable communication procedure.

FIG. 1 shows a 4-step random access procedure. As shown in FIG. 1, the UE transmits a PRACH (physical random access channel) preamble (msg1) in an uplink at step 102. The base station such as next generation NodeB (gNodeB or gNB) replies with a RAR (Random Access Response, msg2) at step 104. The RAR may carry following information: temporary C-RNTI (cell radio network temporary identity), Timing Advance Value, and Uplink Grant Resource. The UE then transmits a RRC (radio resource control) connection request message (msg3) on a physical uplink shared channel (PUSCH) at step 106. The RRC connection request message may contain following information: UE identity and connection establishment cause. The UE transmits PUSCH (msg3) after receiving a timing advance command in the RAR, allowing PUSCH to be received with a timing accuracy within the cyclic prefix. Without this timing advance, a very large CP (Cyclic-Prefix) would be needed in order to be able to demodulate and detect PUSCH, unless the system is applied in a cell with very small distance between UE and the base station. The base station responds with contention resolution message (msg4) to UE at step 108. For example, physical downlink control channel (PDCCH) used to schedule msg2's physical downlink shared channel (PDSCH) may have its cyclic redundancy check (CRC) scrambled by a random access-radio network temporary identifier (RA-RNTI), with the DCI format 1_0. The PDCCH used to schedule the msg4's PDSCH may its CRC scrambled by a temporary cell radio network temporary identifier (TC-RNTI), with the DCI format 1_0.

Clause 8.4 of 3GPP TS 38.213 V15.6.0 describes the HARQ (hybrid automatic repeat request) feedback to the PDSCH carrying msg4. As described in clause 8.4 of 3GPP TS 38.213 V15.6.0, in response to a PUSCH transmission scheduled by a RAR uplink (UL) grant when a UE has not been provided a C-RNTI (cell radio network temporary identifier), the UE attempts to detect a DCI format 1_0 with CRC scrambled by a corresponding TC-RNTI scheduling a PDSCH that includes a UE contention resolution identity. In response to the PDSCH reception with the UE contention resolution identity, the UE transmits HARQ-ACK (acknowledgement) information in a PUCCH (physical uplink control channel). The PUCCH transmission is within a same active UL BWP (bandwidth part) as the PUSCH transmission. A minimum time between the last symbol of the PDSCH reception and the first symbol of the corresponding PUCCH transmission with the HARQ-ACK information is equal to $N_{T,1}+0.5$ msec. $N_{T,1}$ is a time duration of $N_1$ symbols corresponding to a PDSCH processing time for UE processing capability 1 when additional PDSCH DM-RS (dedicated demodulation reference signals) is configured.

Figure 2:
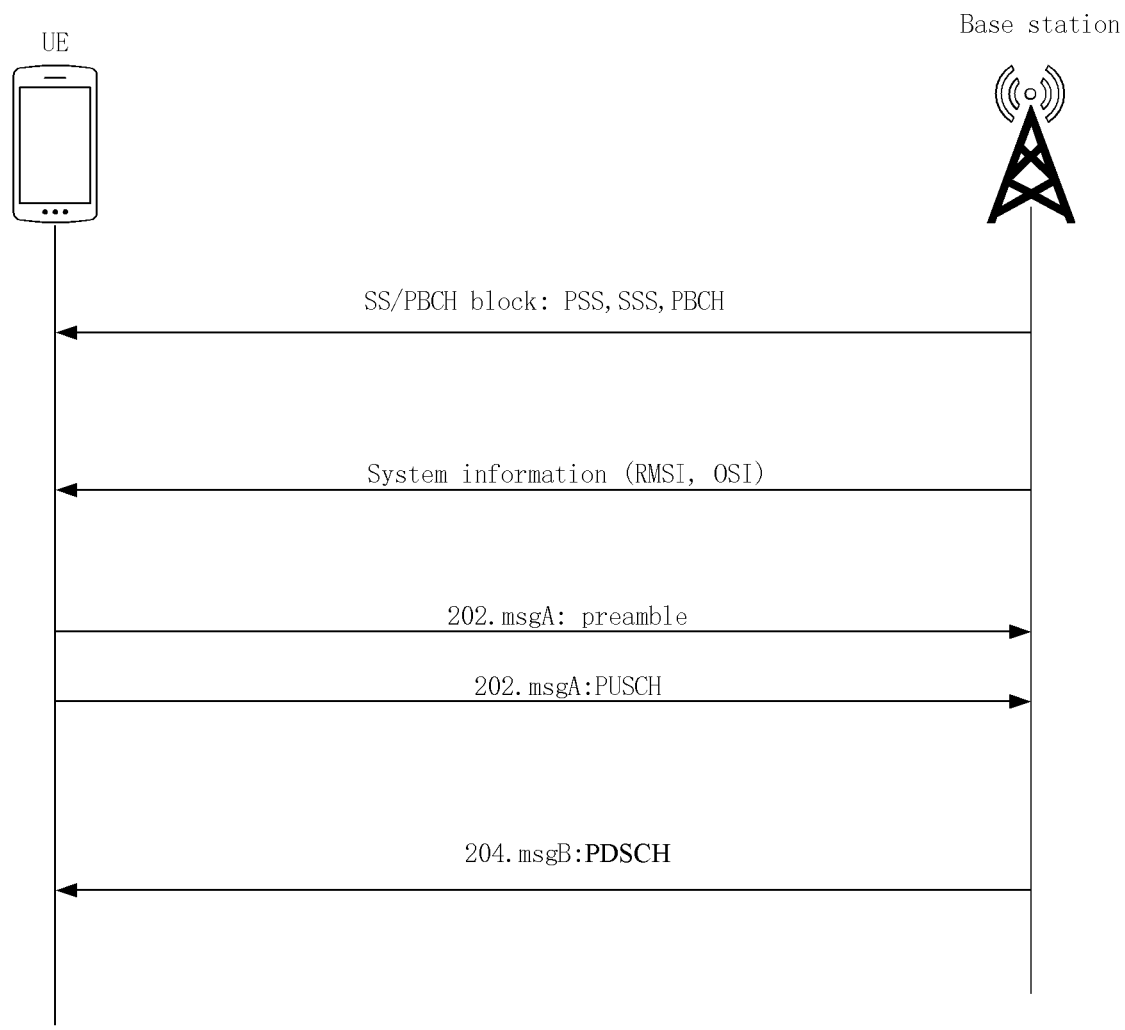
FIG. 2 shows a flowchart of a 2-step random access procedure.

FIG. 2 shows a 2-step random access procedure. As shown in FIG. 2, the base station such as gNB can configure (e.g., via system information signaling) PRACH preamble resources and contention based data resources that may be associated with one or multiple PRACH preambles. At step 202, UE sends a first message (which may be called message A (msgA)) including PRACH preamble on a PRACH occasion together with data such as RRC connection request possibly with some small payload on PUSCH. At step 204, the base station such as gNB sends a second message (which may be called message B (msgB)) which may include information such as one or more of UE identifier assignment, timing advance information, and contention resolution message, etc. if msgA is correctly decoded by the base station such as gNB.

In the 2-step random access procedure, the msgB may carry following content:
- a MAC (medium access control) layer part which may indicate success of the msgA reception (which may be referred to as "successRAR" and may include contention resolution identifier (ID), timing advance information, etc.) or indicate fallback to 4-step access procedure (which may be referred to as "fallbackRAR");
- a higher layer part, which may include an RRC message or other information. The second part (i.e., the higher layer part) of msgB may be transmitted in case the first part (i.e., the MAC part) is a successRAR. The second part of msgB may be omitted when the UE is in RRC_CONNECTED state.

The msgB may carry a message (such as success RAR, fallback RAR, signalling radio bearers (SRB) RRC message or a combination thereof) for a single UE or multiple messages for multiple UEs according to following:
- For CCCH (common control channel), for success or fallback RAR, msgB can multiplex multiple messages for multiple UEs.
- msgB containing the succcessRAR shall not be multiplexed with the legacy 4-step RACH (random access channel) RAR in the same MAC PDU (protocol data unit).
- SRB RRC messages of multiple UEs cannot be multiplexed in same msgB (i.e. same MAC PDU).
- SuccessRAR and fallbackRAR can be multiplexed.
- The fallback RAR shall be included in the general msgB format, i.e., be able to be multiplexed with the successRAR for 2-step RACH.

For RA procedure, there are some issues. For example, in 2-step RA procedure, msgB may play the functions of both msg2 and msg4 of 4-step RA procedure, which is carried in PDSCH scheduled by PDCCH with CRC scrambled by a common RNTI, e.g. RA-RNTI, or by UE/preamble specific RNTI, e.g. msgB RNTI when UE is in RRC idle/inactive mode, or C-RNTI when UE is in RRC connected mode. Therefore a separate structure of DCI may be defined for the scheduling of msgB.

To overcome or mitigate at least one of the above mentioned problems or other problems or provide a useful solution, some embodiments of the present disclosure propose a solution for DCI.

FIG. 3 shows a flowchart of a method 300 according to an embodiment of the present disclosure, which may be performed by an apparatus implemented in or as or communicatively coupled to a network device or any other entity having similar functionality. As such, the network device may provide means or modules for accomplishing various parts of the method 300 as well as means or modules for accomplishing other processes in conjunction with other components.

At block 302, the network device may determine a format of DCI used for scheduling of downlink shared channel. The downlink shared channel is a type of downlink transport channel and may be used for transmission of various information, such as user data information, dedicated control information, a part of the downlink system information, etc. In an embodiment, the downlink shared channel may be used for transmission of msgB of 2-step RA procedure.

The format of DCI may include any suitable DCI formats which can be used for scheduling of downlink shared channel. In an embodiment, the format of DCI may include at least one of DCI format 10, DCI format 1_1 or a new DCI format. As a first example, the DCI format 1_0 and/or DCI format 1_1 may be the same as the DCI format 1_0 and/or DCI format 1_1 as described in 3GPP TS 38.212 V15.7.0. As a second example, the DCI format 1_0 and/or DCI format 1_1 may be an amended version of the DCI format 1_0 and/or DCI format 1_1 as described in 3GPP TS 38.212 V15.7.0, for example at least one information of the DCI format 1_0 and/or DCI format 1_1 as described in 3GPP TS 38.212 V15.7.0 may be amended or deleted or reserved, or at least one information may be added in the DCI format 1_0 and/or DCI format 1_1 as described in 3GPP TS 38.212 V15.7.0. The new DCI format may be a new defined DCI format. For example, the new DCI format may include any suitable information of the DCI format 1_0 and/or DCI format 1_1 as described in 3GPP TS 38.212 V15.7.0 and/or other information. In an embodiment, the new DCI format may be defined for msgB of 2-step RA.

In an embodiment, the network device may determine only DCI format 1_0 used for scheduling of downlink shared channel. For example, the DCI format 1_0 may be always used for any type of msgB transmissions in 2-step RA. This embodiment does not increase the number of DCI formats, which may reduce the complexity of downlink control channel (such as PDCCH) signaling and avoid additional signaling to differentiate the DCI formats.

In an embodiment, the network device may determine DCI format 1_1 or new DCI format used for scheduling of downlink shared channel. For example, this embodiment provides more flexibility for msgB scheduling, especially beneficial if more signaling is needed to schedule more UEs in one msgB, e.g. for the power control of PUCCHs for msgB HARQ feedback for each UE or for the corresponding PUCCH resource configurations for each UE.

In an embodiment, the network device may determine the format of DCI used for scheduling of downlink shared channel based on at least one of a quantity of messages multiplexed in a message transmitted in the scheduled downlink shared channel or a type of message transmitted in the scheduled downlink shared channel. For example, which DCI format may be used for scheduling msgB PDSCH may depend on one or more of the following:
- How many UEs are multiplexed in msgB
- The message type, e.g. success RAR or fallback RAR or SRB RRC message As an example, the DCI format 9 may be used for the msgB carrying messages only for a single UE. The DCI format 1_1 may be used for the msgB carrying messages for multiple UEs.

As another example, different message types may use the same or different DCI format. For example, the DCI format 1_0 may be used for the msgB carrying success RAR or fallback RAR or SRB RRC message. Alternatively, the DCI format 1_1 may be used for the msgB carrying SRB RRC message or success RAR. The DCI format 1_0 may be used for the msgB carrying fallback RAR.

At block 304, the network device may determine an identifier used for scrambling CRC of the format of DCI. The identifier may comprise at least one of a common identifier or a specific identifier. The common identifier may be an identifier which can be used by a group of terminal devices to detect a PDCCH with the DCI format. For example, the common identifier may be RA-RNTI or a common RNTI. The specific identifier may be an identifier which can be used by a terminal device to detect a PDCCH with the DCI format. For example, the specific identifier may be UE/preamble specific RNTI, e.g. msgB RNTI when UE is in RRC idle/inactive mode, or C-RNTI when UE is in RRC connected mode.

At block 306, the network device may transmit information regarding a scheduled downlink shared channel with the format of DCI with the CRC scrambled by the identifier on a downlink control channel to at least one terminal device. The information regarding a scheduled downlink shared channel may include any suitable information such as at least one of information included in the DCI format 1_0 and/or DCI format 1_1 as described in 3GPP TS 38.212 V15.7.0.

In an embodiment, the information regarding the scheduled downlink shared channel may include a combination of information that can be transmitted from the network device to the terminal device by means of the format of DCI with the CRC scrambled by different identifiers such as C-RNTI, CS-RNTI, MCS-C-RNTI, TC-RNTI, RA-RNTI, etc. The C-RNTI, CS-RNTI, MCS-C-RNTI, TC-RNTI, RA-RNTI may be similar to the corresponding RNTI as described in 3GPP TS 38.212 V15.7.0.

In an embodiment, the information regarding the scheduled downlink shared channel may include information that can be transmitted from the network device to the terminal device by means of DCI format 1_0 with the CRC scrambled by temporary cell radio network temporary identifier, TC-RNTI, and the downlink assignment index in DCI format 1_0 with CRC scrambled by TC-RNTI is replaced by transport block, TB, scaling.

For example, a list of parameters for msgB DCI may be a combined version of DCI format 1_0 addressed to RA-RNTI and the DCI format 1_0 addressed to TC-RNTI. The TB scaling parameter may be also signaled for msgB transmission. With this parameter, the TBS (Transport Block size) can be scaled so that a lower coding rate can be applied to improve the msgB PDSCH performance. As an example, the following information may be transmitted by means of the DCI format 1_0 with CRC scrambled by msgB RNTI (e.g., common RNTI or specific RNTI such as UE/preamble specific RNTI, etc.):

Identifier for DCI formats—1 bit
  The value of this bit field is always set to 1, indicating a DL DCI format
Frequency domain resource assignment—$\lceil \log_2 (N_{RB}^{DL,BWP}(N_{RB}^{BWP}+1)/2)\rceil$ bits
  $N_{RB}^{DLBWP}$ is the size of CORESET 0
Time domain resource assignment—4 bits as defined in Subclause 5.1.2.1 of 3GPP TS 38.214 V15.7.0
VRB-to-PRB mapping—1 bit according to Table 7.3.1.2.2-5 of 3GPP TS 38.212 V15.7.0
Modulation and coding scheme—5 bits as defined in Subclause 5.1.3 of 3GPP TS 38.214 V15.7.0, using Table 5.1.3.1-1 of 3GPP TS 38.212 V15.7.0
New data indicator—1 bit
Redundancy version—2 bits as defined in Table 7.3.1.1.1-2 of 3GPP TS 38.212 V15.7.0
HARQ process number—4 bits
TB scaling—2 bits as defined in Subclause 5.1.3.2 of 3GPP TS 38.214 V15.7.0
TPC command for scheduled PUCCH—2 bits as defined in Subclause 7.2.1 of 3GPP TS 38.213 V15.7.0
PUCCH resource indicator—3 bits as defined in Subclause 9.2.3 of 3GPP TS 38.213 V15.7.0
PDSCH-to-HARQ_feedback timing indicator—3 bits as defined in Subclause 9.2.3 of 3GPP TS 38.213 V15.7.0

The above information of the DCI format 1_0 with CRC scrambled by msgB RNTI, may be similar to the DCI format 1_0 with CRC scrambled by TC-RNTI as described in 3GPP TS 38.212 V15.7.0, except that the "Downlink assignment index" field in DCI format 1_0 with CRC scrambled by TC-RNTI is replaced by "TB Scaling" in DCI format 1_0 with CRC scrambled by RA-RNTI.

In an embodiment, the format of DCI is DCI format 1_0 with CRC scrambled by TC-RNTI or RA-RNTI, and at least one information in DCI format 1_0 with CRC scrambled by TC-RNTI or RA-RNTI may be reserved.

In an embodiment, the information regarding the scheduled downlink shared channel includes fields that can be transmitted from the network device to the terminal device by means of a format of DCI with a CRC scrambled by a temporary cell radio network temporary identifier, TC-RNTI.

In an embodiment, the information regarding the scheduled downlink shared channel includes a combination of fields that can be transmitted from the network device to the terminal device by means of a format of DCI with a CRC scrambled by temporary cell radio network temporary identifier, TC-RNTI and a format of DCI with a CRC scrambled by random access radio network temporary identifier, RA-RNTI.

In an embodiment, the information regarding the scheduled downlink shared channel includes fields that are transmitted from the network device to the terminal device by means of DCI format 1_0 with the CRC scrambled by the TC-RNTI, and the downlink assignment index in DCI format 1_0 with CRC scrambled by TC-RNTI is replaced by transport block, TB, scaling.

In an embodiment, at least one fields in the DCI format 1_0 with the CRC scrambled by the TC-RNTI is reserved.

In an embodiment, the reserved at least one field in the DCI format 1_0 with the CRC scrambled by the TC-RNTI comprises: Identifier for DCI formats, New data indicator, Redundancy version, HARQ process number, TPC command for scheduled PUCCH, PUCCH resource indicator, and PDSCH-to-HARQ_feedback timing indicator.

In an embodiment, the reserved at least one information may be depending on at least one of a quantity of messages multiplexed in a message transmitted in the scheduled downlink shared channel; a type of message transmitted in the scheduled downlink shared channel; whether a retransmission is supported for a message transmitted on the scheduled downlink shared channel; whether a dynamic power control is supported for physical uplink control channel, PUCCH, for hybrid automatic repeat request, HARQ, feedback of a message transmitted on the scheduled downlink shared channel; or whether a message transmitted on the scheduled downlink shared channel is a message during a Physical Downlink Control Channel, PDCCH, ordered 2-step random access.

In an embodiment, when no dynamic power control of PUCCH is supported, transmit power control, TPC, command for scheduled PUCCH may be reserved; and/or when the message transmitted on the scheduled downlink shared channel is a message during PDCCH ordered 2-step random access and the identifier is cell-radio network temporary identifier, C-RNTI, or configured scheduling-radio network temporary identifier, CS-RNTI, or MCS-C-RNTI, random access preamble index may be set with all zero values; and/or when the retransmission is not supported for the message transmitted on the scheduled downlink shared channel, new data indicator, redundancy version and HARQ process number may be reserved; and/or when the message transmitted on the scheduled downlink shared channel is not a message during PDCCH ordered 2-step random access and the identifier is cell-radio network temporary identifier, C-RNTI, or configured scheduling-radio network temporary identifier, CS-RNTI, or MCS-C-RNTI, HARQ process number may be reserved.

In an embodiment, the information regarding the scheduled downlink shared channel includes at least following fields: Frequency domain resource assignment, Time domain resource assignment, VRB-to-PRB mapping, Modulation and coding scheme, and TB scaling, Reserved bits.

For example, at least one of the parameters in DCI format 1_0 with CRC scrambled by TC-RNTI or by RA-RNTI as described in 3GPP TS 38.212 V15.7.0 can be reserved in the DCI format 1_0 with CRC scrambled by the RNTI for msgB. The reserved parameters (used in DCI with CRC scrambled by RA-RNTI or TC-RNTI) can depend on at least one of the following:

How many UEs are multiplexed in msgB

The msgB message type, e.g. success RAR or fallback RAR or SRB RRC message

Whether a retransmission is supported for msgB

Whether a dynamic power control is supported for PUCCH for the HARQ feedback of msgB. For example, the TPC command for scheduled PUCCH can be reserved if no dynamic power control of PUCCH is supported.

Whether it's a PDCCH ordered 2-step random access. For example, Random Access Preamble index field may be set with all zero values.

As an example, 3 fields (New data indicator—1 bit, Redundancy version—2 bits as defined in Table 7.3.1.1.1-2, HARQ process number—4 bits) of below DCI format 1_0 can be reserved in case that retransmission of msgB is not supported:

Identifier for DCI formats—1 bit
The value of this bit field is always set to 1, indicating a DL DCI format Frequency domain resource assignment—$\lceil \log_2(N_{RB}^{DL,BWP}(N_{RB}^{DL,BWP}+1)/2) \rceil$ bits
$N_{RB}^{DL,BWP}$ is the size of CORESET 0

Time domain resource assignment—4 bits as defined in Subclause 5.1.2.1 of 3GPP TS 38.214 V15.7.0

VRB-to-PRB mapping—1 bit according to Table 7.3.1.2.2-5 of 3GPP TS 38.212 V15.7.0

Modulation and coding scheme—5 bits as defined in Subclause 5.1.3 of 3GPP TS 38.214 V15.7.0, using Table 5.1.3.1-1 of 3GPP TS 38.212 V15.7.0

New data indicator—1 bit

Redundancy version—2 bits as defined in Table 7.3.1.1.1-2 of 3GPP TS 38.212 V15.7.0

HARQ process number—4 bits

TB Scaling—2 bits

TPC command for scheduled PUCCH—2 bits as defined in Subclause 7.2.1 of 3GPP TS 38.213 V15.7.0

PUCCH resource indicator—3 bits as defined in Subclause 9.2.3 of 3GPP TS 38.213 V15.7.0

PDSCH-to-HARQ_feedback timing indicator—3 bits as defined in Subclause 9.2.3 of 3GPP TS 38.213 V15.7.0

As another example, for the UEs using C-RNTI to address msgB, for PDCCH ordered 2-step RA, Random Access Preamble index in below DCI format 1_0 with CRC scrambled by C-RNTI or CS-RNTI or MCS-C-RNTI are set all zeros:

Identifier for DCI formats—1 bits
The value of this bit field is always set to 1, indicating a DL DCI format Frequency domain resource assignment—$\lceil \log_2(N_{RB}^{DL,BWP}(N_{RB}^{DL,BWP}+1)/2) \rceil$ bits where $N_{BW}^{DL,BWP}$ is given by subclause 7.3.1.0

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

Random Access Preamble index—6 bits according to ra-PreambleIndex in Subclause 5.1.2 of 3GPP TS 38.321 V15.7.0

UL/SUL indicator—1 bit. If the value of the "Random Access Preamble index" is not all zeros and if the UE is configured with supplementary Uplink in ServingCellConfig in the cell, this field indicates which UL carrier in the cell to transmit the PRACH according to Table 7.3.1.1.1-1 of 3GPP TS 38.212 V15.7.0; otherwise, this field is reserved SS/PBCH index—6 bits. If the value of the "Random Access Preamble index" is not all zeros, this field indicates the SS/PBCH that shall be used to determine the RACH occasion for the PRACH transmission; otherwise, this field is reserved.

PRACH Mask index—4 bits. If the value of the "Random Access Preamble index" is not all zeros, this field indicates the RACH occasion associated with the SS/PBCH indicated by "SS/PBCH index" for the PRACH transmission, according to Subclause 5.1.1 of 3GPP TS 38.321 V15.7.0; otherwise, this field is reserved Reserved bits—10 bits Otherwise, all remaining fields are set as follows:

Time domain resource assignment—4 bits as defined in Subclause 5.1.2.1 of 3GPP TS 38.214 V15.7.0

VRB-to-PRB mapping—1 bit according to Table 7.3.1.2.2-5 of 3GPP TS 38.212 V15.7.0

Modulation and coding scheme—5 bits as defined in Subclause 5.1.3 of 3GPP TS 38.214 V15.7.0

New data indicator—1 bit

Redundancy version—2 bits as defined in Table 7.3.1.1.1-2 of 3GPP TS 38.212 V15.7.0

HARQ process number—4 bits

Downlink assignment index—2 bits as defined in Subclause 9.1.3 of 3GPP TS 38.213 V15.7.0, as counter DAI TPC command for scheduled PUCCH—2 bits as defined in Subclause 7.2.1 of 3GPP TS 38.213 V15.7.0

PUCCH resource indicator—3 bits as defined in Subclause 9.2.3 of 3GPP TS 38.213 V15.7.0

PDSCH-to-HARQ_feedback timing indicator—3 bits as defined in Subclause 9.2.3 of 3GPP TS 38.213 V15.7.0

As another example, for C-RNTI addressed msgB other than PDCCH ordered 2-step random access, HARQ process number in below DCI format 1_0 with CRC scrambled by C-RNTI or CS-RNTI or MCS-C-RNTI is not needed.

Identifier for DCI formats—1 bits
The value of this bit field is always set to 1, indicating a DL DCI format Frequency domain resource assignment—$\lceil \log_2(N_{RB}^{DL,BWP}(N_{RB}^{DL,BWP}+1)/2) \rceil$ bits where $N_{RB}^{DL,BWP}$ is given by subclause 7.3.1.0

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

Random Access Preamble index—6 bits according to ra-PreambleIndex in Subclause 5.1.2 of 3GPP TS 38.321 V15.7.0

UL/SUL indicator—1 bit. If the value of the "Random Access Preamble index" is not all zeros and if the UE is configured with supplementary Uplink in Serving-CellConfig in the cell, this field indicates which UL carrier in the cell to transmit the PRACH according to Table 7.3.1.1.1-1 of 3GPP TS 38.212 V15.7.0; otherwise, this field is reserved SS/PBCH index—6 bits. If the value of the "Random Access Preamble index" is not all zeros, this field indicates the SS/PBCH that shall be used to determine the RACH occasion for the PRACH transmission; otherwise, this field is reserved.

PRACH Mask index—4 bits. If the value of the "Random Access Preamble index" is not all zeros, this field indicates the RACH occasion associated with the SS/PBCH indicated by "SS/PBCH index" for the PRACH transmission, according to Subclause 5.1.1 of 3GPP TS 38.321 V15.7.0; otherwise, this field is reserved Reserved bits—10 bits Otherwise, all remaining fields are set as follows:

Time domain resource assignment—4 bits as defined in Subclause 5.1.2.1 of 3GPP TS 38.214 V15.7.0

VRB-to-PRB mapping—1 bit according to Table 7.3.1.2.2-5 of 3GPP TS 38.212 V15.7.0

Modulation and coding scheme—5 bits as defined in Subclause 5.1.3 of 3GPP TS 38.214 V15.7.0

New data indicator—1 bit

Redundancy version—2 bits as defined in Table 7.3.1.1.1-2 of 3GPP TS 38.212 V15.7.0

HARQ process number—4 bits

Downlink assignment index—2 bits as defined in Subclause 9.1.3 of 3GPP TS 38.213 V15.7.0, as counter DAI TPC command for scheduled PUCCH—2 bits as defined in Subclause 7.2.1 of 3GPP TS 38.213 V15.7.0

PUCCH resource indicator—3 bits as defined in Subclause 9.2.3 of 3GPP TS 38.213 V15.7.0

PDSCH-to-HARQ_feedback timing indicator—3 bits as defined in Subclause 9.2.3 of 3GPP TS 38.213 V15.7.0

In various embodiments, the description of various information that can be transmitted by means of above various DCI types may be similar or same as the corresponding information as described in 3GPP TS 38.212 V15.7.0.

In an embodiment, when multiple messages for multiple terminal devices are multiplexed in a message transmitted in the scheduled downlink shared channel, DCI 1_0 format with CRC scrambled by RA-RNTI is used. For example, when multiple UEs multiplexed in one msgB, the DCI 1_0 format with CRC scrambled by RA-RNTI for scheduling msg2 is used. In this case, the retransmission of msgB is not needed since the TB scaling is already supported, and the PUCCH for msgB HARQ feedback can be put in the PDSCH instead of in DCI in order to use this simple DCI.

In an embodiment, when single terminal device's message is carried in a message transmitted in the scheduled downlink shared channel, the DCI 1_0 format with CRC scrambled by TC-RNTI is used. For example, when single UE's information is carried in one msgB, the DCI 1_0 format with CRC scrambled by TC-RNTI for scheduling msg4 is used. In this case, the PDSCH performance can be ensure by the retransmission, since both HARQ ACK and NACK can be supported, so does the soft combining.

In an embodiment, the above two embodiments can be used together, where the benefit is that the signaling overhead to some extent is reduced while the msgB PDSCH performance can be ensured in both single UE and multiple UE case. UE monitors both common RNTI and UE specific RNTI.

FIG. 4 shows a flowchart of a method 400 according to an embodiment of the present disclosure, which may be performed by an apparatus implemented in or as or communicatively coupled to a network device or any other entity having similar functionality. As such, the network device may provide means or modules for accomplishing various parts of the method 400 as well as means or modules for accomplishing other processes in conjunction with other components. For some parts which have been described in the above embodiments, detailed description thereof is omitted here for brevity.

At block 402, the network device may receive a first message including a random access preamble and payload from a terminal device. For example, the terminal device may transmit the first message including a RACH preamble on a RACH occasion and payload on a PUSCH to the network device, and then the network device may receive the first message.

In an embodiment, the first message may be referred to as msgA, which may be similar to the corresponding msgA as described in documents related to 2-step RA of the 3GPP RAN1 (radio access network work group 1). In an embodiment, the first message may be a layer 1 message. The payload on the PUSCH may include any suitable information. For example, the payload on the PUSCH may include higher layer data such as RRC connection request possibly with some small payload on PUSCH. In an embodiment, the payload of the first message may include an identifier (ID) of the terminal device. In an embodiment, the channel structure of first message may include PRACH preamble and PUSCH carrying the payload. In an embodiment, the first message may also include the equivalent contents of msg3 of the 4-step random access procedure.

The random access preamble may be any suitable preamble used for random access procedure. For example, the random access preamble may be RACH preamble which may reuse the 3GPP Release 15 NR PRACH Preambles design. In an embodiment, there may be a mapping between the RACH preamble resource and PUSCH resource unit. In an embodiment, there may be any suitable supported modulation coding scheme(s) (MCS(s)) and time-frequency resource size(s) of PUSCH in msgA. In an embodiment, there may be any suitable power control of PUSCH of msgA. In an embodiment, UCI (uplink control information) may be included in the payload of msgA.

At block 404, the network device may determine a format of downlink control information, DCI, used for scheduling of downlink shared channel in a 2-step random access procedure. Block 404 is similar to block 302 of FIG. 3.

At block 406, the network device may determine an identifier used for scrambling cyclic redundancy check, CRC, of the format of DCI, wherein the identifier comprises at least one of a common identifier or a specific identifier. Block 406 is similar to block 304 of FIG. 3.

At block 408, the network device may transmit information regarding a scheduled downlink shared channel with the format of DCI with the CRC scrambled by the identifier on a downlink control channel to at least one terminal device. Block 408 is similar to block 306 of FIG. 3.

At block 410, the network device may transmit a second message as a response to the first message on the scheduled downlink shared channel to the terminal device. In an embodiment, multiple messages for multiple terminal devices can be multiplexed in the second message. The second message may include any suitable information such as the equivalent contents of msg2 and msg4 of 4-step random access procedure. The second message may be msgB of 2-step random access procedure.

In an embodiment, the first message may be msgA and the second message may be msgB in a 2-step random access procedure.

Figure 5:
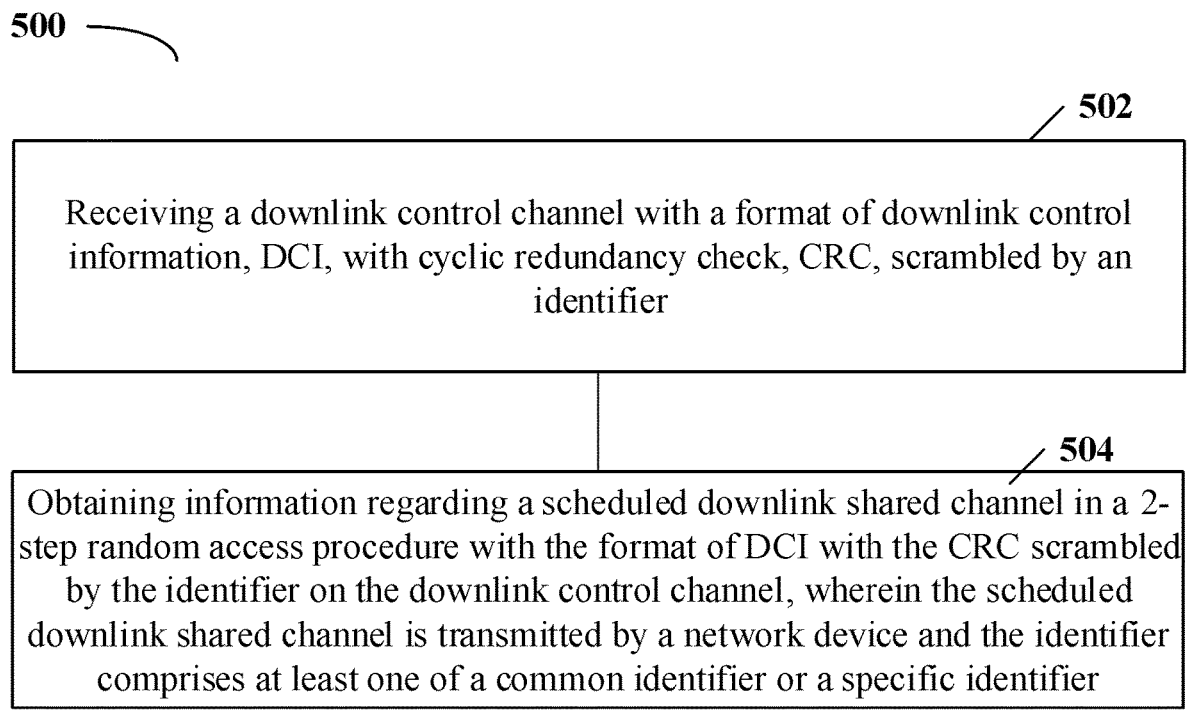
FIG. 5 shows a flowchart of a method according to another embodiment of the present disclosure.

FIG. 5 shows a flowchart of a method 500 according to another embodiment of the present disclosure, which may be performed by an apparatus implemented in or as or communicatively coupled to a terminal device or any other entity having similar functionality. As such, the terminal device may provide means or module for accomplishing various parts of the method 500 as well as means for accomplishing other processes in conjunction with other components. For some parts which have been described in the above embodiments, detailed description thereof is omitted here for brevity.

At block 502, the terminal device may receive a downlink control channel with a format of DCI with CRC scrambled by an identifier. For example, the network device may transmit information regarding a scheduled downlink shared channel with the format of DCI with the CRC scrambled by the identifier on a downlink control channel to at least one terminal device at block 306 of FIG. 3, and then the terminal device may receive (such as detect) the downlink control channel with the format of DCI with CRC scrambled by the identifier. For example, the terminal device may receive the downlink control channel by using a common identifier such as common RNTI and/or a specific identifier such as a specific RNTI.

At block 504, the terminal device may obtain information regarding a scheduled downlink shared channel in a 2-step random access procedure with the format of DCI with the CRC scrambled by the identifier on the downlink control channel. The scheduled downlink shared channel may be transmitted by the network device and the identifier may comprise at least one of a common identifier or a specific identifier. For example, when the terminal device has successfully detected the downlink control channel, the terminal device may obtain information the scheduled downlink shared channel.

In an embodiment, the format of DCI may include at least one of DCI format 1_0, DCI format 1_1 or a new DCI format.

In an embodiment, the format of DCI may be only DCI format 1_0.

In an embodiment, the information regarding the scheduled downlink shared channel may include a combination of information that can be transmitted from the network device to the terminal device by means of the format of DCI with the CRC scrambled by different identifiers.

In an embodiment, the information regarding the scheduled downlink shared channel may include information that can be transmitted from the network device to the terminal device by means of DCI format 1_0 with the CRC scrambled by temporary cell radio network temporary identifier, TC-RNTI, and the downlink assignment index in DCI format 1_0 with CRC scrambled by TC-RNTI is replaced by transport block, TB, scaling.

In an embodiment, the format of DCI may be DCI format 1_0 with CRC scrambled by temporary cell-radio network temporary identifier, TC-RNTI, or random access-radio network temporary identifier, RA-RNTI, and at least one information in DCI format 1_0 with CRC scrambled by TC-RNTI or RA-RNTI is reserved.

In an embodiment, the reserved at least one information may be depending on at least one of a quantity of messages multiplexed in a message transmitted in the scheduled downlink shared channel; a type of message transmitted in the scheduled downlink shared channel; whether a retransmission is supported for a message transmitted on the scheduled downlink shared channel; whether a dynamic power control is supported for physical uplink control channel, PUCCH, for hybrid automatic repeat request, HARQ, feedback of a message transmitted on the scheduled downlink shared channel; or whether a message transmitted on the scheduled downlink shared channel is a message during a Physical Downlink Control Channel, PDCCH, ordered 2-step random access.

In an embodiment, when no dynamic power control of PUCCH is supported, transmit power control, TPC, command for scheduled PUCCH may be reserved; and/or when the message transmitted on the scheduled downlink shared channel is a message during PDCCH ordered 2-step random access and the identifier is cell-radio network temporary identifier, C-RNTI, or configured scheduling-radio network temporary identifier, CS-RNTI, or MCS-C-RNTI, random access preamble index may be set with all zero values; and/or when the retransmission is not supported for the message transmitted on the scheduled downlink shared channel, new data indicator, redundancy version and HARQ process number may be reserved; and/or when the message transmitted on the scheduled downlink shared channel is not a message during PDCCH ordered 2-step random access and the identifier is cell-radio network temporary identifier, C-RNTI, or configured scheduling-radio network temporary identifier, CS-RNTI, or MCS-C-RNTI, HARQ process number may be reserved.

In an embodiment, the downlink shared channel may be physical downlink shared channel, PDSCH, and the downlink control channel is physical downlink control channel, PDCCH.

In an embodiment, when multiple messages for multiple terminal devices are multiplexed in a message transmitted in the scheduled downlink shared channel, DCI 1_0 format with CRC scrambled by random access-radio network temporary identifier, RA-RNTI, may be used.

In an embodiment, when single terminal device's message is carried in a message transmitted in the scheduled downlink shared channel, the DCI 1_0 format with CRC scrambled by TC-RNTI may be used.

FIG. 6 shows a flowchart of a method 600 according to another embodiment of the present disclosure, which may be performed by an apparatus implemented in or as or communicatively coupled to a terminal device or any other entity having similar functionality. As such, the terminal device may provide means or module for accomplishing various parts of the method 600 as well as means for accomplishing other processes in conjunction with other components. For some parts which have been described in the above embodiments, detailed description thereof is omitted here for brevity.

At block 602, the terminal device may transmit a first message including a random access preamble and payload to the network device.

At block 604, the terminal device may detect a downlink control channel with a format of downlink control information, DCI, with cyclic redundancy check, CRC, scrambled by an identifier. Block 604 is similar to block 502 of FIG. 5.

At block 606, the terminal device may obtain information regarding a scheduled downlink shared channel in a 2-step random access procedure with the format of DCI with the CRC scrambled by the identifier on the downlink control channel. The scheduled downlink shared channel is transmitted by the network device and the identifier comprises at least one of a common identifier or a specific identifier. Block 606 is similar to block 504 of FIG. 5.

At block 608, the terminal device may receive a second message as a response to the first message on the scheduled downlink shared channel from the network device. In an embodiment, multiple messages for multiple terminal devices can be multiplexed in the second message.

In an embodiment, the first message may be msgA and the second message may be msgB in a 2-step random access procedure.

Embodiments herein afford many advantages, of which a non-exhaustive list of examples follows. Some embodiments herein may provide the DCI structure for the scheduling of the second message, i.e. msgB, in 2-step random access (RA) procedure in NR. Some embodiments herein may provide a forward compatible manner. Some embodiments herein may reduce the complexity of RA procedure protocol (such as 2-step RA procedure). Some embodiments herein may minimize signaling overhead while providing the necessary flexibility for the scheduling of msgB PDSCH. The embodiments herein are not limited to the features and advantages mentioned above. A person skilled in the art will recognize additional features and advantages upon reading the following detailed description.

Figure 7:
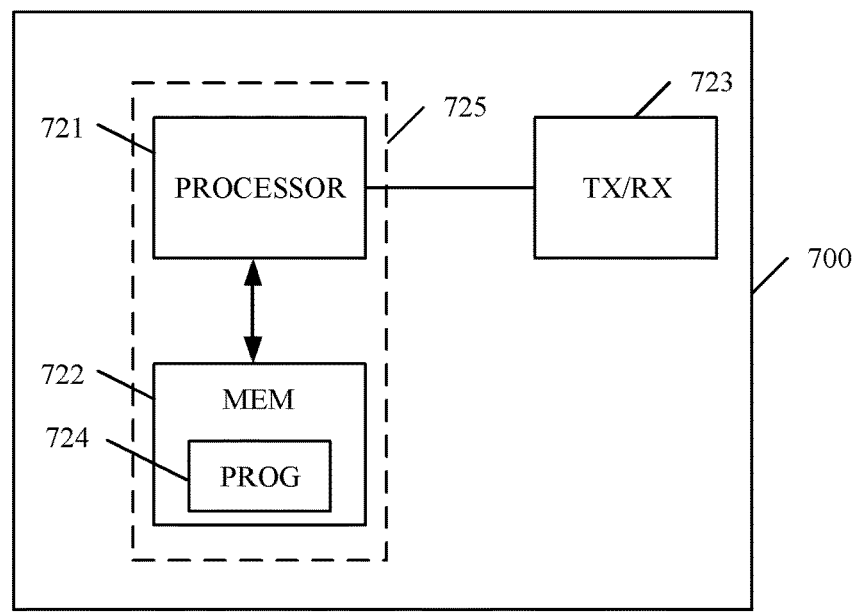
FIG. 7 is a block diagram showing an apparatus suitable for use in practicing some embodiments of the disclosure.

FIG. 7 is a block diagram showing an apparatus suitable for use in practicing some embodiments of the disclosure. For example, any one of the terminal device and the network device described above may be implemented through the apparatus 700.

The apparatus 700 comprises at least one processor 721, such as a DP, and at least one MEM 722 coupled to the processor 721. The apparatus 720 may further comprise a transmitter TX and receiver RX 723 coupled to the processor 721. The MEM 722 stores a PROG 724. The PROG 724 may include instructions that, when executed on the associated processor 721, enable the apparatus 720 to operate in accordance with the embodiments of the present disclosure. A combination of the at least one processor 721 and the at least one MEM 722 may form processing means 725 adapted to implement various embodiments of the present disclosure.

Various embodiments of the present disclosure may be implemented by computer program executable by one or more of the processor 721, software, firmware, hardware or in a combination thereof.

The MEM 722 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 721 may be of any type suitable to the local technical environment, and may include one or more of general purpose computers, special purpose computers, microprocessors, digital signal processors DSPs and processors based on multicore processor architecture, as non-limiting examples.

Figure 8:
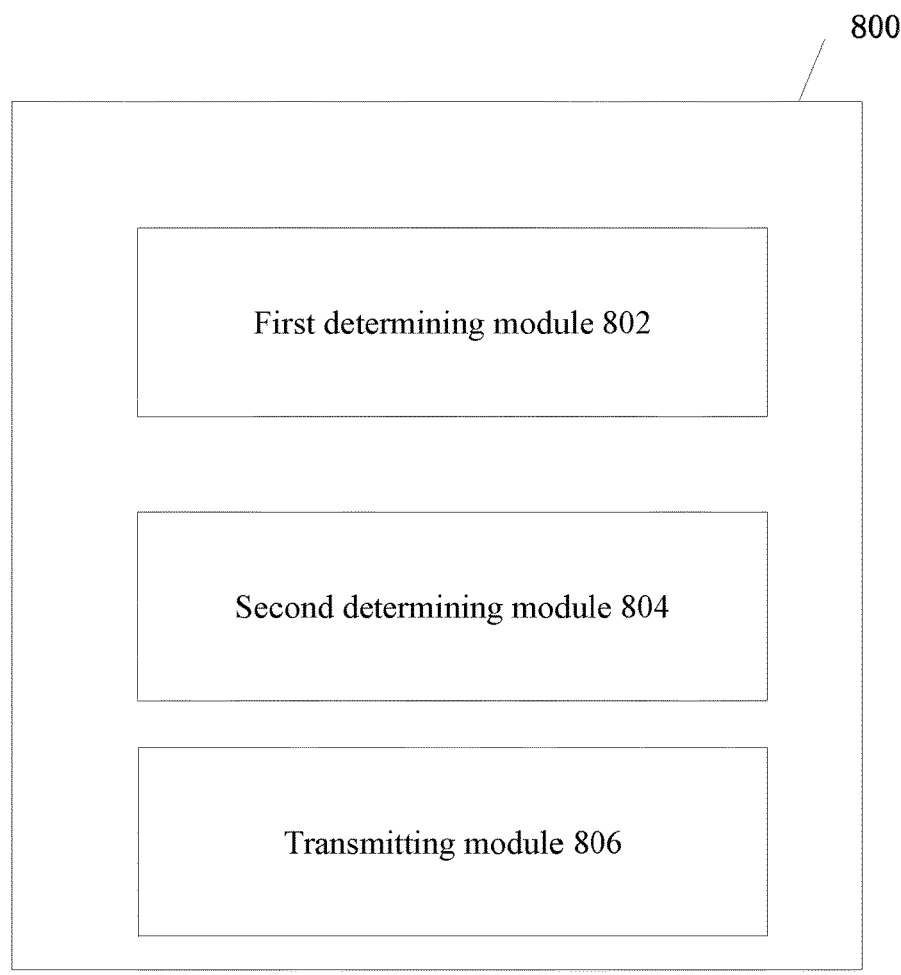
FIG. 8 is a block diagram showing a network device according to an embodiment of the disclosure.

FIG. 8 is a block diagram showing a network device according to an embodiment of the disclosure. As shown, the network device 800 comprises a first determining module 802, a second determining module 804 and a transmitting module 806. The first determining module 802 may be configured to determine a format of downlink control information, DCI, used for scheduling of downlink shared channel. The second determining module 804 may be configured to determining an identifier used for scrambling cyclic redundancy check, CRC, of the format of DCI, wherein the identifier comprises at least one of a common identifier or a specific identifier. The transmitting module 806 may be configured to transmitting information regarding a scheduled downlink shared channel with the format of DCI with the CRC scrambled by the identifier on a downlink control channel to at least one terminal device.

Figure 9:
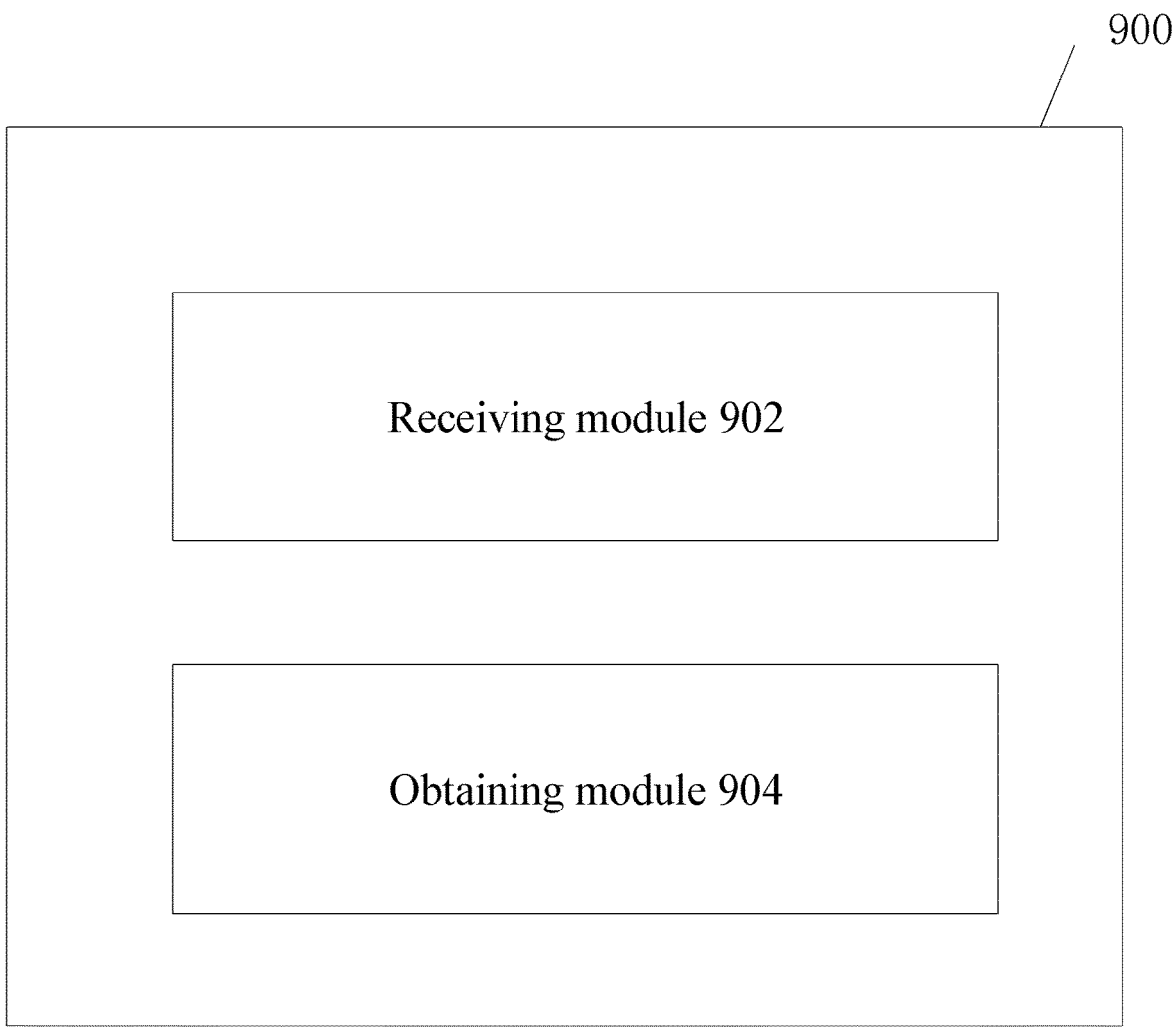
FIG. 9 is a block diagram showing a terminal device according to an embodiment of the disclosure.

FIG. 9 is a block diagram showing a terminal device according to an embodiment of the disclosure. As shown, the terminal device 900 comprises a receiving module 902 and an obtaining module 904. The receiving module 902 may be configured to detect a downlink control channel with a format of downlink control information, DCI, with cyclic redundancy check, CRC, scrambled by an identifier, wherein the scheduled downlink shared channel is transmitted by a network device and the identifier comprises at least one of a common identifier or a specific identifier. The obtaining module 904 may be configured to obtain information regarding a scheduled downlink shared channel with the format of DCI with the CRC scrambled by the identifier on the downlink control channel.

Figure 10:
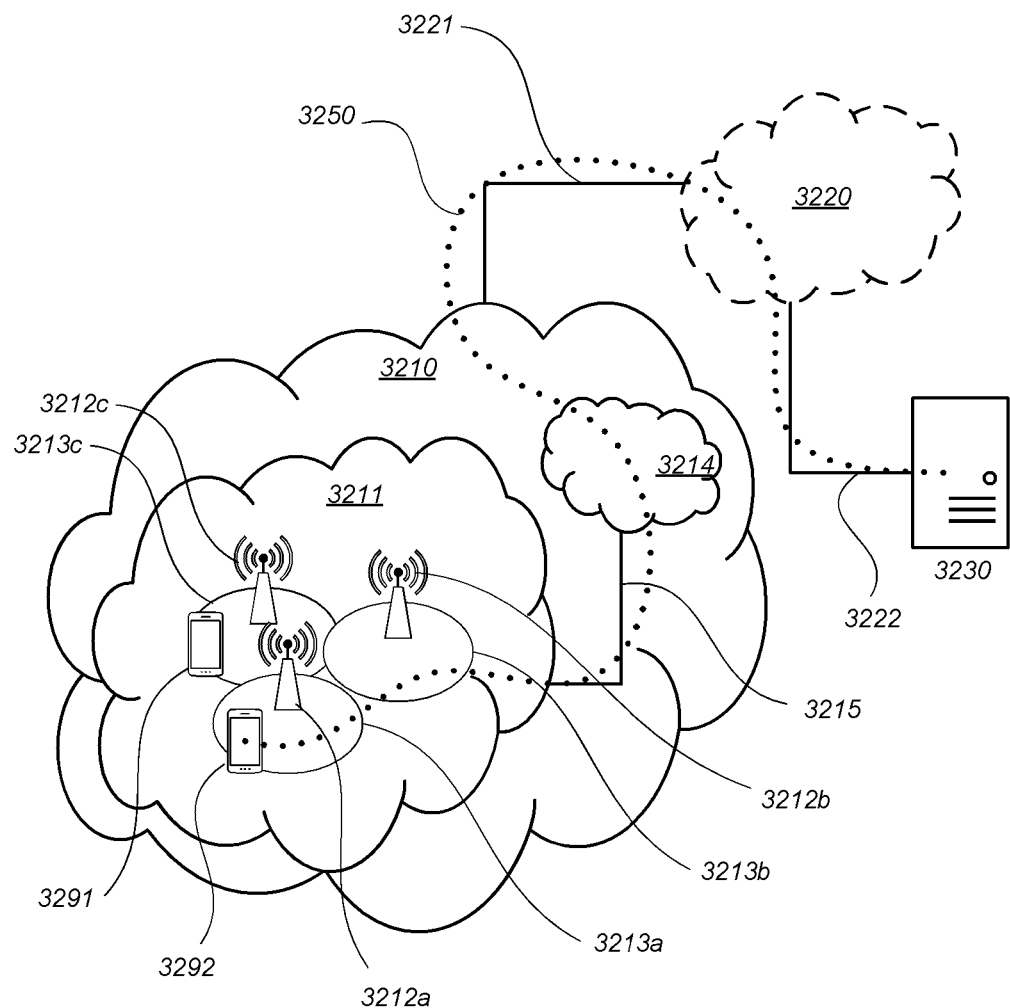
FIG. 10 is a diagram showing a telecommunication network connected via an intermediate network to a host computer in accordance with some embodiments.

With reference to FIG. 10, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 10 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 11) served by base station 3320. Communication interface 3326 may be configured to facilitate connection 3360 to host computer 3310. Connection 3360 may be direct or it may pass through a core network (not shown in FIG. 11) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 11:
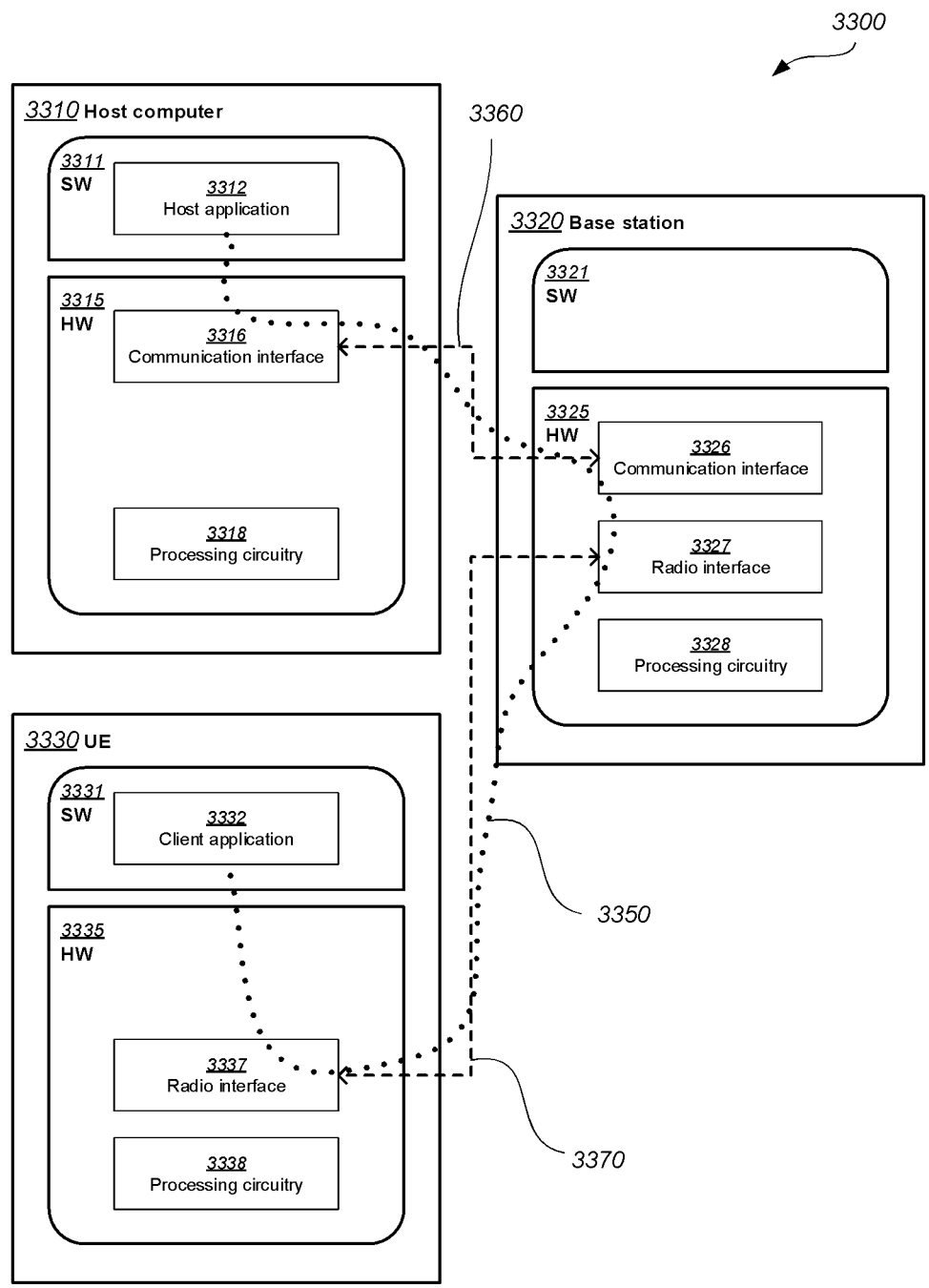
FIG. 11 is a diagram showing a host computer communicating via a base station with a user equipment in accordance with some embodiments.

It is noted that host computer 3310, base station 3320 and UE 3330 illustrated in FIG. 11 may be similar or identical to host computer 3230, one of base stations 3212a, 3212b, 3212c and one of UEs 3291, 3292 of FIG. 10, respectively. This is to say, the inner workings of these entities may be as shown in FIG. 11 and independently, the surrounding network topology may be that of FIG. 10.

In FIG. 11, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 12:
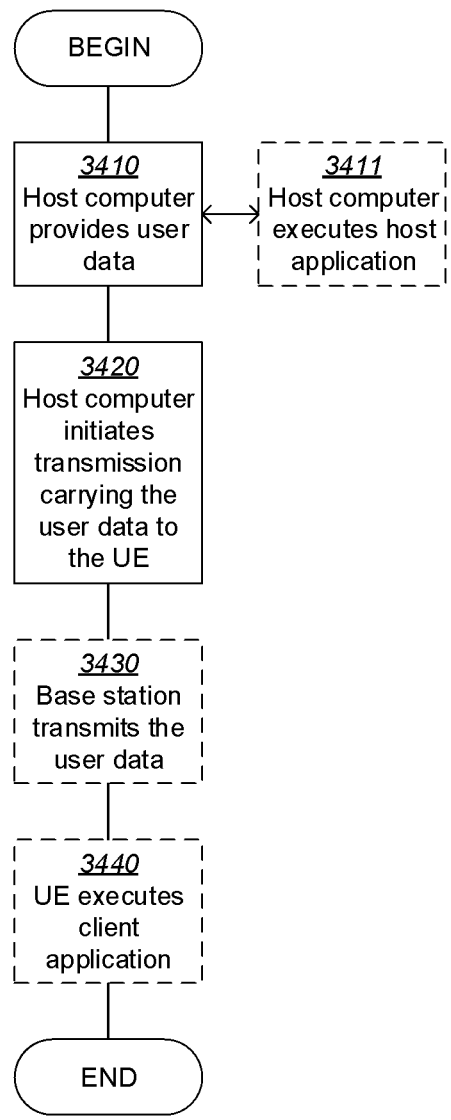
FIG. 12 is a flowchart illustrating a method implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 13:
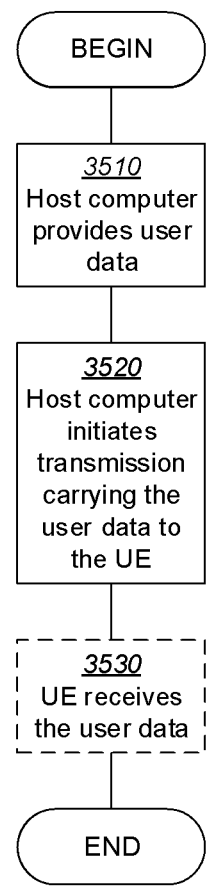
FIG. 13 is a flowchart illustrating a methods implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 14:
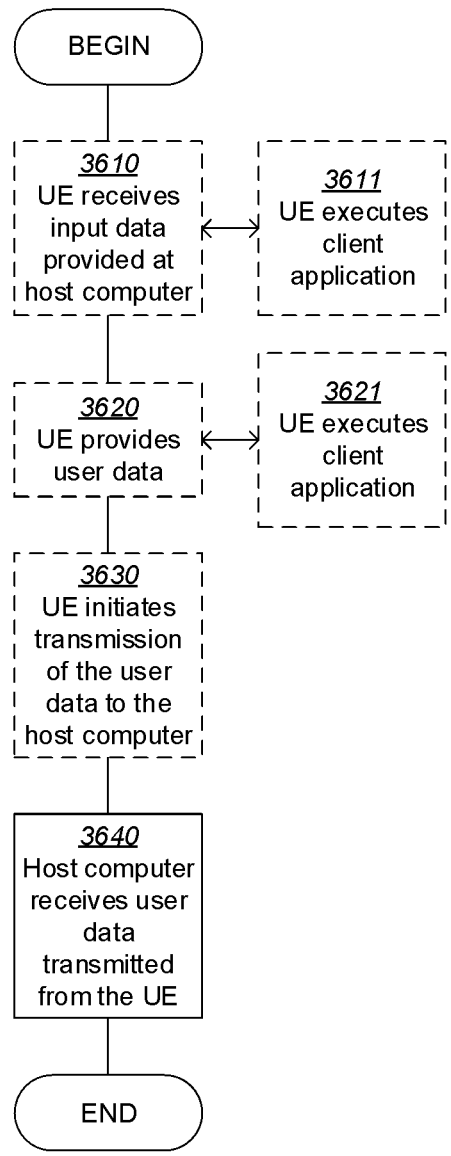
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 15:
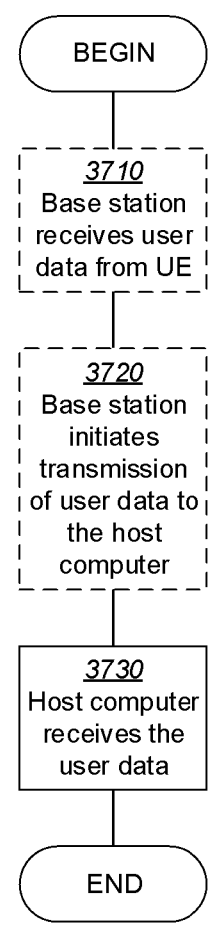
FIG. 15 is a flowchart illustrating a method implemented in a communication system in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 20 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a network device, comprising:
determining a format of downlink control information (DCI) used for scheduling of downlink shared channel in a 2-step random access procedure;
determining an identifier used for scrambling cyclic redundancy check (CRC) of the format of DCI, wherein the identifier comprises at least one of a common identifier or a specific identifier; and
transmitting information regarding a scheduled downlink shared channel with the format of DCI with the CRC scrambled by the identifier on a downlink control channel to at least one terminal device,
wherein the information regarding the scheduled downlink shared channel includes fields that are transmitted from the network device to the at least one terminal device by means of DCI format 1_0 with the CRC scrambled by a temporary cell radio network temporary identifier (TC-RNTI), and a downlink assignment index in DCI format 1_0 with CRC scrambled by the TC-RNTI is replaced by transport block (TB) scaling; wherein at least one field in the DCI format 1_0 with the CRC scrambled by the TC-RNTI is reserved; and wherein the reserved at least one field in the DCI format 1_0 with the CRC scrambled by the TC-RNTI comprises: Identifier for DCI formats, New data indicator, Redundancy version, hybrid automatic repeat request (HARQ) process number, transmit power control (TPC) command for scheduled physical uplink control channel (PUCCH), PUCCH resource indicator, and physical downlink shared channel (PDSCH)-to-HARQ feedback timing indicator.

2. The method according to claim 1, wherein:
when no dynamic power control of PUCCH is supported, TPC command for scheduled PUCCH is reserved;
when a message transmitted on the scheduled downlink shared channel is a message during physical downlink control channel (PDCCH) ordered 2-step random access and the identifier is a cell-radio network temporary identifier (C-RNTI) or configured scheduling-radio network temporary identifier (CS-RNTI) or modulation coding scheme-cell-radio network temporary identifier (MCS-C-RNTI), random access preamble index is set with all zero values;
when a retransmission is not supported for the message transmitted on the scheduled downlink shared channel, new data indicator, redundancy version and HARQ process number are reserved;
when the message transmitted on the scheduled downlink shared channel is not a message during PDCCH ordered 2-step random access and the identifier is C-RNTI or CS-RNTI or MCS-C-RNTI, HARQ process number is reserved; or
any combination thereof.

3. The method according to claim 1, wherein the information regarding the scheduled downlink shared channel includes at least following fields: Frequency domain resource assignment, Time domain resource assignment, virtual resource block (VRB)-to-physical resource block (PRB) mapping, and Modulation and coding scheme.

4. The method according to claim 1, wherein when multiple messages for multiple terminal devices are multiplexed in a message transmitted in the scheduled downlink shared channel, DCI 1_0 format with CRC scrambled by random access-radio network temporary identifier (RA-RNTI) is used.

5. A method performed by a terminal device, comprising:
receiving a downlink control channel with a format of downlink control information (DCI) with cyclic redundancy check (CRC) scrambled by an identifier; and
obtaining information regarding a scheduled downlink shared channel in a 2-step random access procedure with the format of DCI with the CRC scrambled by the identifier on the downlink control channel, wherein the scheduled downlink shared channel is transmitted by a network device and the identifier comprises at least one of a common identifier or a specific identifier,
wherein the information regarding the scheduled downlink shared channel includes fields that are transmitted from the network device to the terminal device by means of DCI format 1_0 with the CRC scrambled by a temporary cell radio network temporary identifier (TC-RNTI), and a downlink assignment index in DCI format 1_0 with CRC scrambled by the TC-RNTI is replaced by transport block (TB) scaling; wherein at least one field in the DCI format 1_0 with the CRC scrambled by the TC-RNTI is reserved; and wherein the reserved at least one field in the DCI format 1_0 with the CRC scrambled by the TC-RNTI comprises: Identifier for DCI formats, New data indicator, Redundancy version, hybrid automatic repeat request (HARQ) process number, transmit power control (TPC) command for scheduled physical uplink control channel (PUCCH), PUCCH resource indicator, and physical downlink shared channel (PDSCH)-to-HARQ feedback timing indicator.

6. The method according to claim 5, further comprising:
transmitting a first message including a random access preamble and payload to the network device; and
receiving a second message as a response to the first message on the scheduled downlink shared channel from the network device.

7. The method according to claim 5, wherein:
when no dynamic power control of PUCCH is supported, TPC command for scheduled PUCCH is reserved;
when a message transmitted on the scheduled downlink shared channel is a message during physical downlink control channel (PDCCH) ordered 2-step random access and the identifier is cell-radio network temporary identifier (C-RNTI) or configured scheduling-radio network temporary identifier (CS-RNTI) or modulation coding scheme-cell-radio network temporary identifier (MCS-C-RNTI), random access preamble index is set with all zero values;
when a retransmission is not supported for the message transmitted on the scheduled downlink shared channel, new data indicator, redundancy version and HARQ process number are reserved;
when the message transmitted on the scheduled downlink shared channel is not a message during PDCCH ordered 2-step random access and the identifier is C-RNTI or CS-RNTI or MCS-C-RNTI, HARQ process number is reserved; or
any combination thereof.

8. The method according to claim 5, wherein the information regarding the scheduled downlink shared channel includes at least following fields: Frequency domain resource assignment, Time domain resource assignment, virtual resource block (VRB)-to-physical resource block (PRB) mapping, and Modulation and coding scheme.

9. The method according to claim 5, wherein when multiple messages for multiple terminal devices are multiplexed in a message transmitted in the scheduled downlink shared channel, DCI 1_0 format with CRC scrambled by random access-radio network temporary identifier (RA-RNTI) is used.

10. An apparatus at a terminal device, comprising:
a processor; and
a memory coupled to the processor, said memory containing instructions which, when executed by said processor, cause said apparatus to:
detect a downlink control channel with a format of downlink control information (DCI) with cyclic redundancy check (CRC) scrambled by an identifier; and
obtain information regarding a scheduled downlink shared channel in a 2-step random access procedure with the format of DCI with the CRC scrambled by the identifier on the downlink control channel, wherein the scheduled downlink shared channel is transmitted by a network device and the identifier comprises at least one of a common identifier or a specific identifier,
wherein the information regarding the scheduled downlink shared channel includes fields that are transmitted from the network device to the terminal device by means of DCI format 1_0 with the CRC scrambled by a temporary cell radio network temporary identifier (TC-RNTI), and a downlink assignment index in DCI format 1_0 with CRC scrambled by the TC-RNTI is replaced by transport block (TB) scaling; wherein at least one field in the DCI format 1_0 with the CRC scrambled by the TC-RNTI is reserved; and wherein the reserved at least one field in the DCI format 1_0 with the CRC scrambled by the TC-RNTI comprises: Identifier for DCI formats, New data indicator, Redundancy version, hybrid automatic repeat request (HARQ) process number, transmit power control (TPC) command for scheduled physical uplink control channel (PUCCH), PUCCH resource indicator, and physical downlink shared channel (PDSCH)-to-HARQ feedback timing indicator.

11. The apparatus according to claim 10, wherein:
when no dynamic power control of PUCCH is supported, TPC command for scheduled PUCCH is reserved;
when a message transmitted on the scheduled downlink shared channel is a message during physical downlink control channel (PDCCH) ordered 2-step random access and the identifier is a cell-radio network temporary identifier (C-RNTI) or configured scheduling-radio network temporary identifier (CS-RNTI) or modulation coding scheme-cell-radio network temporary identifier (MCS-C-RNTI), random access preamble index is set with all zero values;
when a retransmission is not supported for the message transmitted on the scheduled downlink shared channel, new data indicator, redundancy version and HARQ process number are reserved;
when the message transmitted on the scheduled downlink shared channel is not a message during PDCCH ordered 2-step random access and the identifier is C-RNTI or CS-RNTI or MCS-C-RNTI, HARQ process number is reserved; or
any combination thereof.

* * * * *